(12) United States Patent
Suga et al.

(10) Patent No.: US 11,736,190 B2
(45) Date of Patent: *Aug. 22, 2023

(54) DERIVATION METHOD, COMMUNICATION SYSTEM AND ACCOMMODATION STATION APPARATUS

(71) Applicant: NIPPON TELEGRAPH AND TELEPHONE CORPORATION, Tokyo (JP)

(72) Inventors: Mizuki Suga, Musashino (JP); Kota Ito, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 17/430,122

(22) PCT Filed: Jan. 31, 2020

(86) PCT No.: PCT/JP2020/003657
§ 371 (c)(1),
(2) Date: Aug. 11, 2021

(87) PCT Pub. No.: WO2020/166381
PCT Pub. Date: Aug. 20, 2020

(65) Prior Publication Data
US 2022/0103257 A1    Mar. 31, 2022

(30) Foreign Application Priority Data
Feb. 15, 2019  (JP) ................................ 2019-025670

(51) Int. Cl.
*H04B 10/2575* (2013.01)
*H04B 10/079* (2013.01)
*H04B 10/572* (2013.01)

(52) U.S. Cl.
CPC ... *H04B 10/2575* (2013.01); *H04B 10/07957* (2013.01); *H04B 10/572* (2013.01)

(58) Field of Classification Search
CPC .......... H04B 10/2575; H04B 10/07957; H04B 10/572; H04B 10/25751; H04B 10/25752;
(Continued)

(56) References Cited

U.S. PATENT DOCUMENTS 11,146,351 B1 * 10/2021 Xu ..................... H04B 10/2575
2006/0209800 A1 * 9/2006 Lee ..................... H04W 12/062
370/352

(Continued)

FOREIGN PATENT DOCUMENTS

JP          4246724 B2    4/2009

OTHER PUBLICATIONS

Dennis T. K. Tong et al., A Novel Multiwavelength Optically Controlled Phased Arrray Antenna with a Programmable Dispersion Matrix, IEEE Photonics Technology Letters, vol. 8, No. 6, Jun. 1996.
(Continued)

*Primary Examiner* — Hibret A Woldekidan
(74) *Attorney, Agent, or Firm* — Harness, Dickey & Pierce, P.L.C.

(57) ABSTRACT

A derivation method is a derivation method performed by a communication system, including: a transmission step of transmitting a first radio-wave signal according to an optical signal with a first wavelength and a second radio-wave signal according to an optical signal with a second wavelength; a communication start time information acquisition
(Continued)

step of acquiring information on a first communication start time and information on a second communication start time; a reception time information acquisition step of acquiring information on a first reception time that is a reception time related to the first radio-wave signal, and information on a second reception time that is a reception time related to the second radio-wave signal; and an optical fiber length derivation step of deriving a length of the optical fiber, based on the first communication start time, the first reception time, the second communication start time, the second reception time, a group velocity or a group delay time of the optical signal with the first wavelength, and a group velocity or a group delay time of the optical signal with the second wavelength.

6 Claims, 8 Drawing Sheets

(58) Field of Classification Search
CPC ........ H04B 10/25754; H04B 10/25753; H04B 10/25759; H04B 10/077; H04B 10/272; H04B 10/506; H04W 84/12; H04W 88/085; H04W 92/12
See application file for complete search history.

(56) References Cited

U.S. PATENT DOCUMENTS

| | | | |
|---|---|---|---|
| 2013/0316730 A1* | 11/2013 | Ding | G01S 5/02521 455/456.1 |
| 2019/0109643 A1* | 4/2019 | Campos | H04Q 11/0067 |
| 2022/0021456 A1* | 1/2022 | Otsuki | H04B 10/272 |
| 2022/0141788 A1* | 5/2022 | Suga | H04W 72/12 370/350 |
| 2022/0393764 A1* | 12/2022 | Ito | H04B 10/506 |

OTHER PUBLICATIONS

Recommendation ITU-T G.650.3, Test methods for installed single-mode optical fibre cable links, 2017.
IEEE Std 802.3ah—2004.

* cited by examiner

DERIVATION METHOD, COMMUNICATION SYSTEM AND ACCOMMODATION STATION APPARATUS

CROSS-REFERENCE TO RELATED APPLICATIONS

This application is a 371 U.S. National Phase of International Application No. PCT/JP2020/003657 filed on Jan. 31, 2020, which claims priority to Japanese Application No. 2019-025670 filed on Feb. 15, 2019. The entire disclosures of the above applications are incorporated herein by reference.

TECHNICAL FIELD

The present invention relates to a derivation method, a communication system, and an accommodation station device.

BACKGROUND ART

In recent years, attention has turned to millimeter-wave band communication, which can use broader bandwidths than microwave bands, in order to meet the growing demand for wireless communication. However, since propagation loss increases according to radio signal frequencies in a wireless segment, a transmission distance of millimeter-wave band communication is shorter than a transmission distance of microwave band communication. Accordingly, a communication system for millimeter-wave band communication is capable of communication in a more limited area.

A method is proposed that expands an area by placing an antenna in such a manner that the antenna extends outward from a signal processing unit. According to the method, an accommodation station device including the signal processing unit is separated from the antenna by using a radio-over-fiber (RoF) technology. The antenna is placed as an extension station device, whereby an apparent coverage area is expanded.

According to the method, the coverage area is further expanded through point to multi point (P2MP), in which a plurality of antennas are connected to a single signal processing unit. Separation of the signal processing unit from the antennas is expected to bring about configurational simplification and power saving of the extension station devices, and cost merits. For a method for connecting the plurality of antennas to the single signal processing unit, a method using a passive optical network (PON) technology is considered.

Since propagation loss is large in a wireless segment, beamforming (BF) is used in millimeter-wave band communication in some cases. Radio waves are concentratedly radiated in a specified direction through beamforming, whereby power lost as propagation loss is compensated for. For the beamforming to be properly performed, a communication system needs to control directivity of radio waves (directivity control) by using a plurality of antenna elements.

Even if an extension station device does not include a signal processing unit, a signal processing unit of an accommodation station device needs to perform optical beamforming. A typical method for the optical beamforming is a method in which a signal processing unit forms a beam, according to a phase delay that occurs differently per wavelength due to wavelength dispersion in an optical fiber (see Patent Document 1, Non-Patent Document 1).

According to the method, in order to properly control directivity, the accommodation station device derives phase delays occurring in an optical fiber. To derive phase delays, the signal processing unit needs to estimate a length of the optical fiber (hereinafter, referred to as "optical fiber length").

Methods for estimating an optical fiber length include a method in which Optical Time Domain Reflectometry (OTDR) is used (see Non-Patent Document 2), and a method in which Round Trip Time (RTT) is used (see Non-Patent Document 3).

CITATION LIST

Patent Document
Patent Document 1: Japanese Patent No. 4246724

Non-Patent Documents

Non-Patent Document 1: Dennis T. K. Tong and Ming C. Wu, "A Novel Multiwavelength Optically Controlled Phased Array Antenna with a Programmable Dispersion Matrix," IEEE Photonics Technology Letters, vol. 8, no. 6, pp. 812-814, June 1996.
Non-Patent Document 2: Recommendation ITU-T G.650.3: "Test methods for installed single-mode optical fibre cable links," 2017.
Non-Patent Document 3: IEEE Std 802.3ah-2004.

SUMMARY OF THE INVENTION

Technical Problem

According to the method in which Optical Time Domain Reflectometry is used, an accommodation station device estimates an optical fiber length, based on a time period from when a pulse signal is transmitted to an extension station device until the pulse signal reflected by the extension station device returns to the accommodation station device. However, when an optical fiber forms a passive optical network (PON), the accommodation station device cannot identify which extension station device the pulse signal is reflected from, because a plurality of pulse signals reflected from a plurality of extension station devices are mixed up. Accordingly, the accommodation station device cannot estimate an optical fiber length.

According to the method in which Round Trip Time is used, an accommodation station device measures a time period taken by a signal to make a round trip (round trip time) between the accommodation station device and an extension station device, through a sequence called P2MP discovery. The accommodation station device estimates an optical fiber length, based on the measured round trip time. The extension station device transmits, to the accommodation station device, a frame in which an own identifier of the extension station device is embedded. The accommodation station device measures a round trip time between the accommodation station device and each extension station device, based on an identifier embedded in a frame received from the extension station device. However, according to the method in which Round Trip Time is used, since an extension station device needs to embed an own identifier of the extension station device into a frame, each extension station device needs to include a signal processing unit. Accordingly, the conventional accommodation station device cannot estimate an optical fiber length in some cases unless each extension station device includes a signal processing unit.

In view of the above-described circumstances, an object of the present invention is to provide a derivation method, a communication system, and an accommodation station device that make it possible to estimate an optical fiber length between an accommodation station device and an extension station device, without the extension station device including a signal processing unit.

Means for Solving the Problem

An aspect of the present invention is a derivation method performed by a communication system including an access point and a wireless terminal, the access point including an accommodation station device and an extension station device connected to each other through an optical fiber transmitting an optical signal, and the wireless terminal communicating with the extension station device by using a radio-wave signal, the derivation method including: a transmission step of, when a time in the accommodation station device and a time in the wireless terminal are synchronized with each other, transmitting a first radio-wave signal according to an optical signal with a first wavelength, and a second radio-wave signal according to an optical signal with a second wavelength; a communication start time information acquisition step of acquiring information on a first communication start time that is a time at which communication using the optical signal with the first wavelength is started, and information on a second communication start time that is a time at which communication using the optical signal with the second wavelength is started; a reception time information acquisition step of acquiring information on a first reception time that is a reception time related to the first radio-wave signal, and information on a second reception time that is a reception time related to the second radio-wave signal; and an optical fiber length derivation step of deriving a length of the optical fiber, based on the first communication start time, the first reception time, the second communication start time, the second reception time, a group velocity or a group delay time of the optical signal with the first wavelength, and a group velocity or a group delay time of the optical signal with the second wavelength.

Another aspect of the present invention is the derivation method, further including a transmission time period derivation step of deriving a first transmission time period that is a time period from the first communication start time until the first reception time, and deriving a second transmission time period that is a time period from the second communication start time until the second reception time, wherein the optical fiber length derivation step derives the length of the optical fiber, based on a difference between the first transmission time period and the second transmission time period, the group velocity or the group delay time of the optical signal with the first wavelength, and the group velocity or the group delay time of the optical signal with the second wavelength.

Another aspect of the present invention is the derivation method, wherein the transmission time period derivation step acquires information on the first transmission time period from an electrical signal according to the received first radio-wave signal, and acquires information on the second transmission time period from an electrical signal according to the received second radio-wave signal.

Another aspect of the present invention is the derivation method, wherein the reception time information acquisition step acquires the information on the first reception time from an electrical signal according to the received first radio-wave signal, and acquires the information on the second reception time from an electrical signal according to the received second radio-wave signal.

Another aspect of the present invention is a communication system, including: an access point including an accommodation station device and an extension station device connected to each other through an optical fiber transmitting an optical signal; and a wireless terminal that communicates with the extension station device by using a radio-wave signal, wherein the accommodation station device includes a transmission unit that, when a time in the accommodation station device and a time in the wireless terminal are synchronized with each other, transmits a first radio-wave signal according to an optical signal with a first wavelength, and a second radio-wave signal according to an optical signal with a second wavelength, a communication start time information acquisition unit that acquires information on a first communication start time that is a time at which communication using the optical signal with the first wavelength is started, and information on a second communication start time that is a time at which communication using the optical signal with the second wavelength is started, a reception time information acquisition unit that acquires information on a first reception time that is a reception time related to the first radio-wave signal, and information on a second reception time that is a reception time related to the second radio-wave signal, and an optical fiber length derivation unit that derives a length of the optical fiber, based on the first communication start time, the first reception time, the second communication start time, the second reception time, a group velocity or a group delay time of the optical signal with the first wavelength, and a group velocity or a group delay time of the optical signal with the second wavelength.

Another aspect of the present invention is an accommodation station device in a communication system including an access point and a wireless terminal, the access point including the accommodation station device and an extension station device connected to each other through an optical fiber transmitting an optical signal, and the wireless terminal communicating with the extension station device by using a radio-wave signal, the accommodation station device including: a transmission unit that, when a time in the accommodation station device and a time in the wireless terminal are synchronized with each other, transmits a first radio-wave signal according to an optical signal with a first wavelength, and a second radio-wave signal according to an optical signal with a second wavelength; a communication start time information acquisition unit that acquires information on a first communication start time that is a time at which communication using the optical signal with the first wavelength is started, and information on a second communication start time that is a time at which communication using the optical signal with the second wavelength is started; a reception time information acquisition unit that acquires information on a first reception time that is a reception time related to the first radio-wave signal, and information on a second reception time that is a reception time related to the second radio-wave signal; and an optical fiber length derivation unit that derives a length of the optical fiber, based on the first communication start time, the first reception time, the second communication start time, the second reception time, a group velocity or a group delay time of the optical signal with the first wavelength, and a group velocity or a group delay time of the optical signal with the second wavelength.

Effects of the Invention

According to the present invention, it is possible to estimate an optical fiber length between an accommodation station device and an extension station device, without the extension station device including a signal processing unit.

DESCRIPTION OF EMBODIMENTS

Embodiments of the present invention will be described in detail, with reference to drawings.

Figure 1:
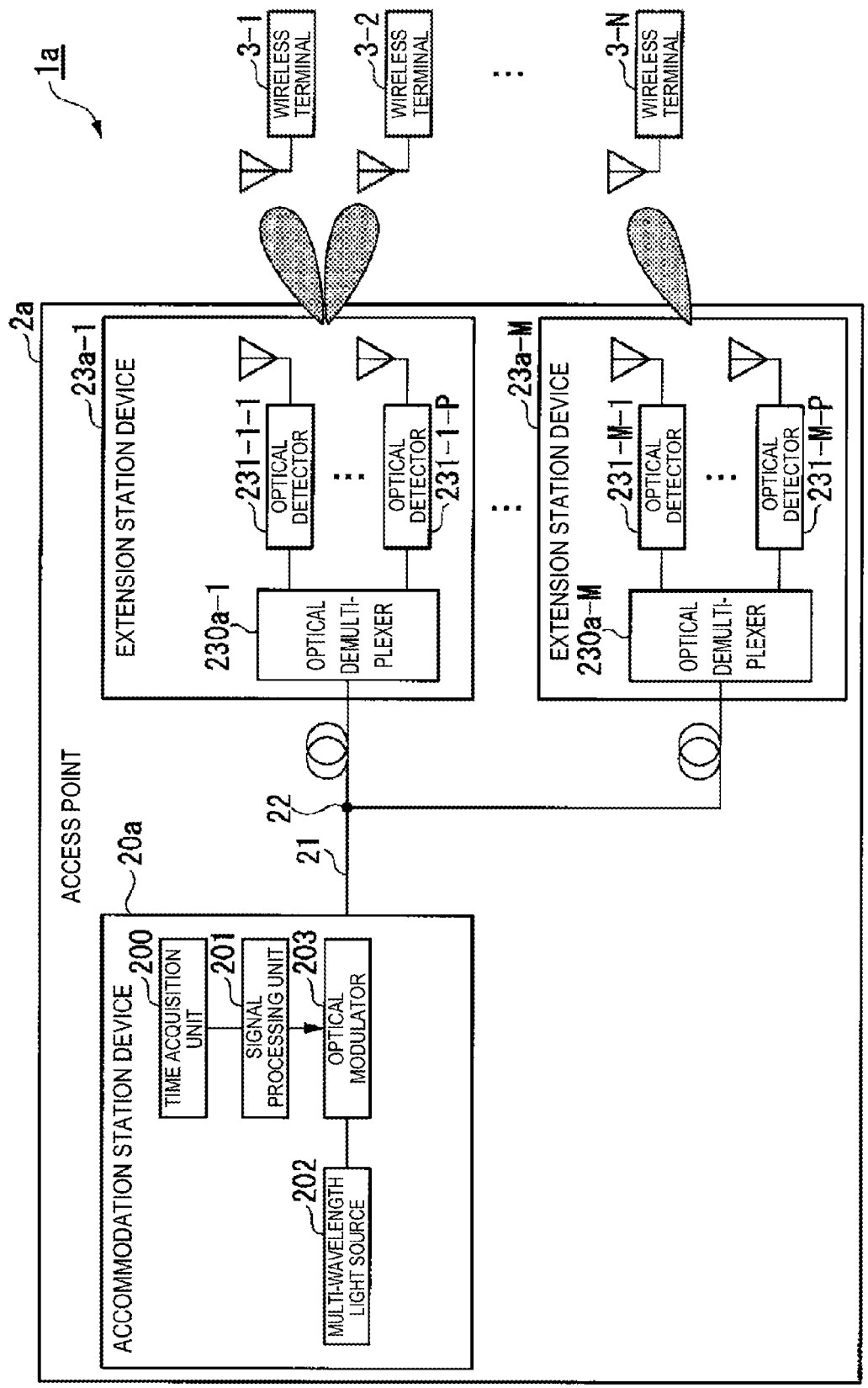
FIG. 1 shows an example of a configuration of a communication system in a first embodiment.

FIG. 1 shows an example of a configuration of a communication system $1a$. The communication system $1a$ is a radio-over-fiber (ROF) system with a configuration of a passive optical network (PON). The communication system $1a$ includes an access point $2a$ and wireless terminals $3$-$1$ to $3$-N (N is an integer equal to or larger than one).

The access point $2a$ includes an accommodation station device (an accommodation station apparatus) $20a$, an optical fiber $21$, an optical splitter $22$, and extension station devices $23a$-$1$ to $23a$-M (M is an integer equal to or larger than two). The extension station devices $23a$ are placed in such a manner that the extension station devices $23a$ extend outward from the accommodation station device $20a$. The accommodation station device $20a$ and the extension station devices $23a$ are separated from each other by using a radio-over-fiber technology.

The accommodation station device $20a$ includes a time acquisition unit $200$, a signal processing unit $201$, a multi-wavelength light source $202$, and an optical modulator $203$. Each extension station device $23a$-$m$ (m is any one of integers from one to M) includes an optical demultiplexer $230a$-$m$ and optical detectors $231$-$m$-$1$ to $231$-$m$-P (P is an integer equal to or larger than two). Each optical detector $231$ includes an antenna (transmission unit).

The access point $2a$ is a communication device that connects one or more wireless terminals $3$ to a predetermined network through wireless communication. The accommodation station device $20a$ is a device that accommodates signals of a plurality of wireless terminals $3$ through wireless communication. The optical fiber $21$ transmits an optical signal between the accommodation station device $20a$ and each extension station device $23a$. The optical splitter $22$ splits a downlink (downstream) optical signal transmitted in the optical fiber $21$. The optical splitter $22$ multiplexes a plurality of uplink (upstream) optical signals transmitted in the optical fiber $21$. The extension station devices $23a$ perform wireless communication with the wireless terminal $3$. The wireless terminal $3$ is a terminal that performs wireless communication.

For the communication system $1a$ to perform optical beamforming, it is not necessary to estimate an optical fiber length between every one of the extension station devices $23a$ and the accommodation station device $20a$ in the access point $2a$. The accommodation station device $20a$ estimates an optical fiber length between the accommodation station device $20a$ and an extension station device $23a$ to which the wireless terminal $3$ (station), with which the accommodation station device $20a$ is communicating, is connected through wireless communication. The communication system $1a$ performs optical beamforming, based on an estimated value of the optical fiber length of the optical fiber $21$ in which an optical signal is transmitted when the accommodation station device $20a$ communicates with the wireless terminal $3$-$n$.

Accordingly, the accommodation station device $20a$ and the wireless terminal $3$ synchronize respective absolute time information with each other. Using optical signals with mutually different wavelengths, the accommodation station device $20a$ derives, for each optical signal wavelength, a transmission time period "$\Delta t$" of signals (the optical signal, a radio-wave signal, and the like) between the accommodation station device $20a$ and the wireless terminal $3$, based on the absolute time information. Instead of the accommodation station device $20a$ deriving the transmission time period, the wireless terminal $3$ may derive the transmission time period "$\Delta t$" for each optical signal wavelength. The accommodation station device $20a$ estimates the optical fiber length, based on a difference between a transmission time period "$\Delta t_1$" of communication using an optical signal with a first wavelength and a transmission time period "$\Delta t_2$" of communication using an optical signal with a second wavelength.

Figure 2:
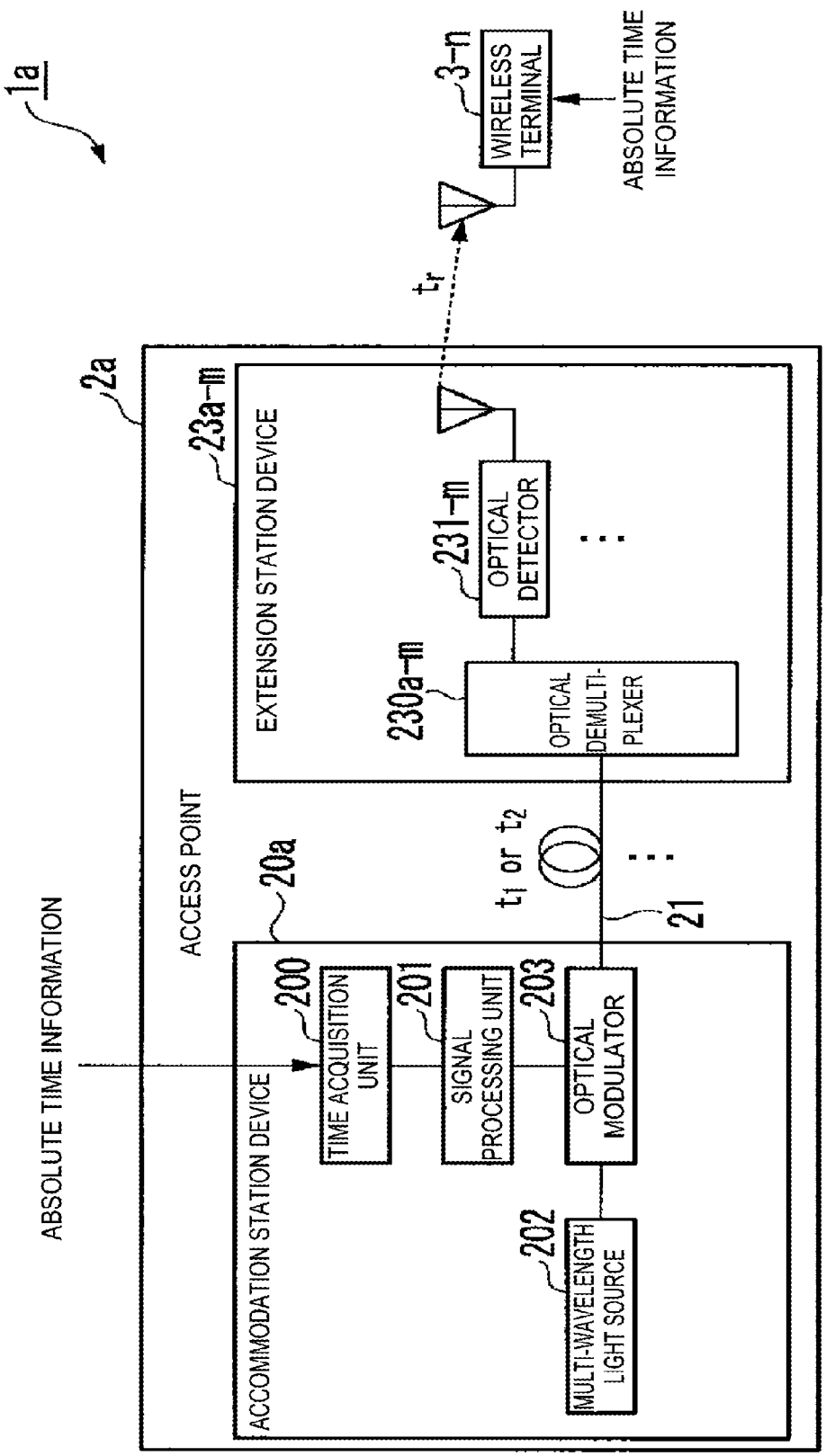
FIG. 2 shows an example of a configuration of part of the communication system in the first embodiment.

FIG. 2 shows an example of a configuration of part of the communication system $1a$. A portion or all of the time acquisition unit $200$ and the signal processing unit $201$ are implemented as software in such a manner that a processor such as a CPU (Central Processing Unit) executes a program stored in a memory that is a non-volatile recording medium (non-transitory recording medium). A portion or all of the time acquisition unit $200$ and the signal processing unit $201$ may be implemented by using hardware such as an LSI (Large Scale Integrated circuit) or an FPGA (Field Programmable Gate Array).

Any extension station device $23a$-$m$ is communicationally connected to any wireless terminal $3$-$n$ with which the accommodation station device $20a$ is communicating. The accommodation station device $20a$ estimates the optical fiber length "l" between the accommodation station device $20a$ and the extension station device $23a$-$m$, based on a transmission time period "$t_1$" of an optical signal with a wavelength "$\lambda_1$" in an optical fiber segment, a transmission time period "$t_2$" of an optical signal with a wavelength "$\lambda_2$" in the optical fiber segment, and a transmission time period "$t_r$" in a wireless segment.

When downlink communication using the optical signal with the wavelength "$\lambda_1$" is started, the accommodation station device $20a$ acquires absolute time information as information on a communication start time "$t_{1\_tx}$". The optical signal with the wavelength "$\lambda_1$" transmitted through the optical fiber $21$ is transmitted to one of the optical detectors $231$-$m$ via the optical demultiplexer $230a$-$m$ that is a variable optical demultiplexer. The optical detector $231$-$m$ transmits a radio-wave signal according to the optical signal with the wavelength "$\lambda_1$", at a predetermined frequency, from an antenna of the optical detector 231-*m*. An antenna of the wireless terminal 3-*n* receives the radio-wave signal transmitted from the antenna of the optical detector 231-*m* via the wireless segment. When the antenna of the wireless terminal 3-*n* is an array antenna, one antenna element included in the array antenna may receive the radio-wave signal based on the optical signal with the wavelength "$\lambda_1$". When the radio-wave signal based on the optical signal with the wavelength "$\lambda_1$" is received, the wireless terminal 3-*n* acquires absolute time information as information on a reception time "$t_{1\_rx}$".

When downlink communication using the optical signal with the wavelength "$\lambda_2$" is started, the accommodation station device 20*a* acquires absolute time information as information on a communication start time "$t_{2\_tx}$". The optical signal with the wavelength "$\lambda_2$" transmitted through the optical fiber 21 is transmitted to one of the optical detectors 231-*m* via the optical demultiplexer 230*a*-*m* that is a variable optical demultiplexer. The optical detector 231-*m* transmits a radio-wave signal according to the optical signal with the wavelength "$\lambda_2$", at a predetermined frequency, from an antenna of the optical detector 231-*m*. The antenna of the wireless terminal 3-*n* receives the radio-wave signal transmitted from the antenna of the optical detector 231-*m* via the wireless segment. When the antenna of the wireless terminal 3-*n* is an array antenna, one antenna element included in the array antenna may receive the radio-wave signal based on the optical signal with the wavelength "$\lambda_2$". When the radio-wave signal based on the optical signal with the wavelength "$\lambda_2$" is received, the wireless terminal 3-*n* acquires absolute time information as information on a reception time "$t_{2\_rx}$".

The transmission time period "$\Delta t_1$" in the case where the downlink communication using the optical signal with the wavelength "$\lambda_1$" is started is expressed by using the communication start time "$t_{1\_tx}$" and the reception time "$t_{1\_rx}$". The transmission time period "$\Delta t_2$" in the case where the downlink communication using the optical signal with the wavelength "$\lambda_2$" is started is expressed by using the communication start time "$t_{2\_tx}$" and the reception time "$t_{2\_rx}$". The transmission time period "$\Delta t_1$" and the transmission time period "$\Delta t_2$" are expressed as in Expression (1).

$$\begin{cases} \Delta t_1 = t_{1\_rx} - t_{1\_tx} \\ \Delta t_2 = t_{2\_rx} - t_{2\_tx} \end{cases} \quad (1)$$

In measurement of the transmission time period "$\Delta t_1$" and measurement of the transmission time period "$\Delta t_2$", the extension station device 23*a*-*m* uses the same antenna of the extension station device 23*a*-*m*. In the measurement of the transmission time period "$\Delta t_1$" and the measurement of the transmission time period "$\Delta t_2$", the wireless terminal 3-*n* uses the same antenna of the wireless terminal 3-*n*. In such cases, in the measurement of the transmission time period "$\Delta t_1$" and the measurement of the transmission time period "$\Delta t_2$", transmission distances of the radio-wave signals in the wireless segment are identical. In other words, the transmission time periods "$t_r$" of the radio-wave signals in the wireless segment between the optical detectors 231-*m* and the wireless terminal 3-*n* are constant in the measurement of the transmission time period "$\Delta t_1$" and the measurement of the transmission time period "$\Delta t_2$".

The transmission time period "$\Delta t_1$" and the transmission time period "$\Delta t_2$" are expressed as in Expression (2).

$$\Delta t_1 = t_1 + t_r \quad (2)$$
$$\Delta t_2 = t_2 + t_r$$

Here, "$t_1$" represents the transmission time period of the optical signal with the wavelength "$\lambda_1$" in the optical fiber segment including the optical fiber 21. "$t_2$" represents the transmission time period of the optical signal with the wavelength "$\lambda_2$" in the optical fiber segment including the optical fiber 21. The transmission time periods "$t_r$" of the radio-wave signals in the wireless segment are cancelled out, with a difference between the transmission time periods in the optical fiber segment remaining, and hence the difference between the transmission time period "$\Delta t_1$" and the transmission time period "$\Delta t_2$" is expressed as in Expression (3).

$$\Delta t_1 - \Delta t_2 = t_1 - t_2 \quad (3)$$

A transmission rate (group velocity) of an optical signal in the optical fiber segment is determined depending on a type (material or the like) of the optical fiber 21 and a wavelength of the optical signal. The difference between the transmission time period "$\Delta t_1$" and the transmission time period "$\Delta t_2$" is expressed as in Expression (4), based on Expression (3).

$$\Delta t_1 - \Delta t_2 = l/v_1 - l/v_2 \quad (4)$$

Here, "l" represents the optical fiber length. "$v_1$" represents a transmission rate (group velocity) of the optical signal with the wavelength "$\lambda_1$" in the optical fiber segment. "$v_2$" represents a transmission rate (group velocity) of the optical signal with the wavelength "$\lambda_2$" in the optical fiber segment. The optical fiber length "l" is expressed as in Expression (5).

$$l = \frac{v_2 v_1}{v_2 - v_1}(\Delta t_1 - \Delta t_2) \quad (5)$$

The accommodation station device 20*a* derives the optical fiber length "l" as in Expression (5), based on the transmission rate "$v_1$" and the transmission rate "$v_2$" that are already known, and on the transmission time period "$\Delta t_1$" and the transmission time period "$\Delta t_2$" that are based on the acquired absolute time information.

Next, details of the accommodation station device 20*a* and the wireless terminal 3 will be described.

The transmission time period "$\Delta t_1$" and the transmission time period "$\Delta t_2$" are derived by the accommodation station device 20*a* or the wireless terminal 3.

(Where the Accommodation Station Device 20*a* Derives the Transmission Time Periods)

The accommodation station device 20*a* stores the information on the communication start time "$t_{1\_tx}$" and the information on the communication start time "$t_{2\_tx}$". The wireless terminal 3-*n* feeds back a radio-wave signal including the information on the reception time "$t_{1\_rx}$" to the accommodation station device 20a. The wireless terminal 3-n feeds back a radio-wave signal including the information on the reception time "$t_{2\_rx}$" to the accommodation station device 20a. The accommodation station device 20a derives the transmission time period "$\Delta t_1$", based on the communication start time "$t_{1\_tx}$" and the fed back reception time "$t_{1\_rx}$". The accommodation station device 20a derives the transmission time period "$\Delta t_2$", based on the communication start time "$t_{2\_tx}$" and the fed back reception time "$t_{2\_rx}$".

Figure 3:
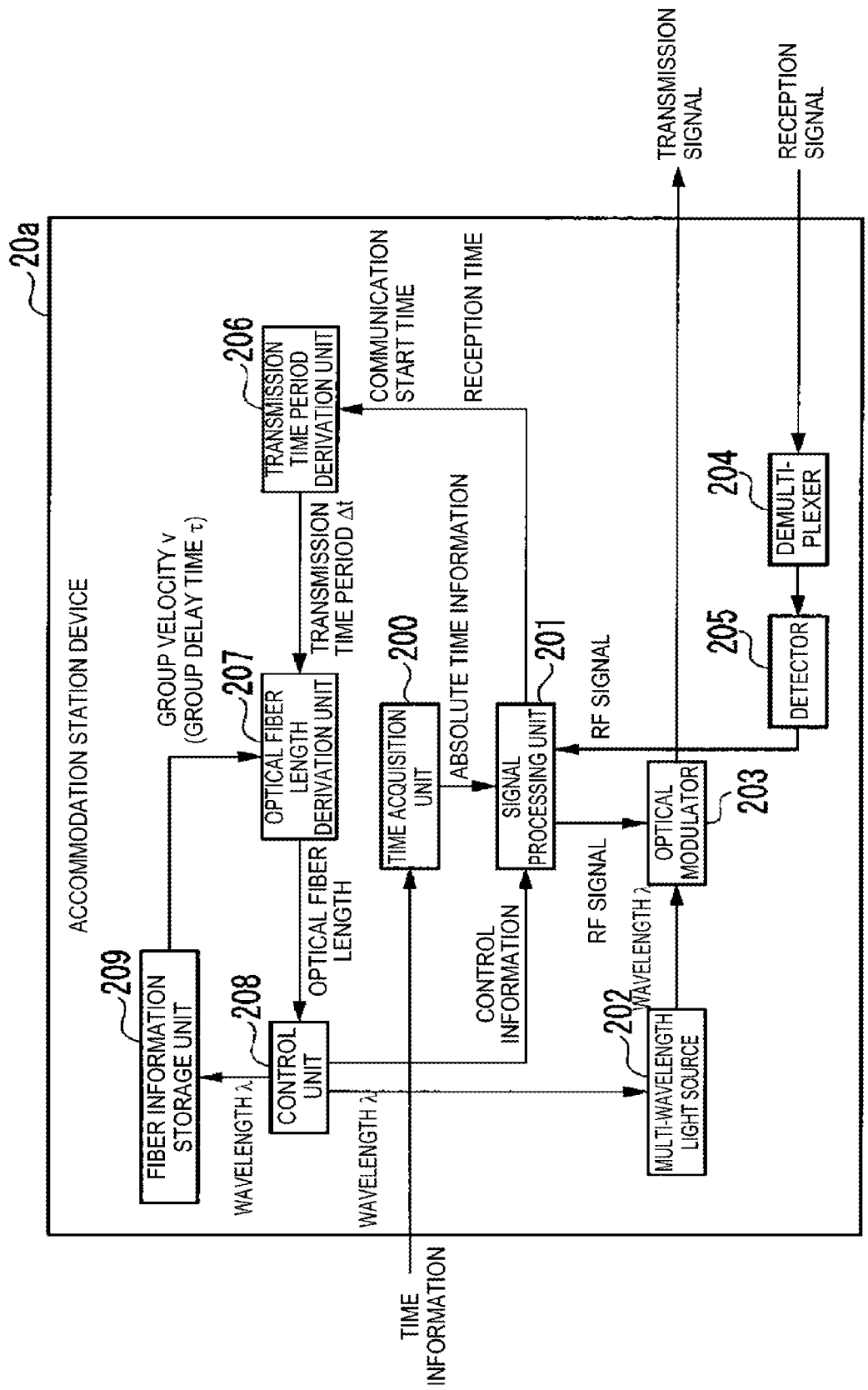
FIG. 3 shows an example of a configuration of an accommodation station device in the first embodiment.

FIG. 3 shows an example of a configuration of the accommodation station device 20a in the case where the accommodation station device 20a derives the transmission time periods. The accommodation station device 20a includes the time acquisition unit 200, the signal processing unit 201, the multi-wavelength light source 202, the optical modulator 203, a demultiplexer 204, a detector 205, a transmission time period derivation unit 206, an optical fiber length derivation unit 207, a control unit 208, and a fiber information storage unit 209.

The time acquisition unit 200 acquires time information from a radio-controlled clock or the like. The time acquisition unit 200 outputs absolute time information indicated by the acquired time information to the signal processing unit 201. The signal processing unit 201 acquires the absolute time information from the time acquisition unit 200. The signal processing unit 201 acquires control information for optical beamforming based on an estimated optical fiber length from the control unit 208. The control information is, for example, weighting information for a phase of a radio signal to be transmitted from each antenna element. The multi-wavelength light source 202 outputs light with a wavelength "λ" specified by the control unit 208 to the optical modulator 203.

The optical modulator 203 receives the light outputted from the multi-wavelength light source 202. The optical modulator 203 acquires, from the signal processing unit 201, an electrical signal (hereinafter, referred to as "RF (Radio Frequency) signal") associated with a radio-wave signal. The optical modulator 203 performs modulation processing according to the downlink RF signal on each of streams of light with mutually different wavelengths. The optical modulator 203 transmits, as a transmission signal, downlink optical signals that are results of the modulation processing to the extension station device 23a-m.

The demultiplexer 204 receives, as a reception signal, a plurality of uplink optical signals from the extension station device 23a-m. The demultiplexer 204 demultiplexes the plurality of uplink optical signals. The demultiplexer 204 outputs each of the demultiplexed optical signals to the detector 205. The detector 205 performs predetermined wave detection processing on each optical signal. The detector 205 outputs uplink RF signals that are results of the wave detection processing to the signal processing unit 201.

When the accommodation station device 20a starts downlink communication using an optical signal, the transmission time period derivation unit 206 acquires information on a communication start time from the signal processing unit 201. When the accommodation station device 20a receives an uplink optical signal, the transmission time period derivation unit 206 acquires information on a reception time from the signal processing unit 201. The transmission time period derivation unit 206 derives a transmission time period of each optical signal as in Expressions (1) and (2), based on the communication start time and the reception time. The transmission time period derivation unit 206 may derive a difference between the transmission time periods, as in Expression (3).

The optical fiber length derivation unit 207 acquires information on group velocities from the fiber information storage unit 209. The optical fiber length derivation unit 207 derives an optical fiber length as in Expressions (3), (4), and (5), based on the derived transmission time periods and the group velocities.

The control unit 208 specifies, to the multi-wavelength light source 202, a wavelength "λ" of an optical signal used in optical beamforming, based on the derived optical fiber length and control information for the optical beamforming. The fiber information storage unit 209 stores a data table beforehand in which information on wavelengths "λ" and group velocities are associated with each other. The fiber information storage unit 209 outputs, to the optical fiber length derivation unit 207, information on a group velocity associated with the wavelength "λ" specified by the control unit 208 to the multi-wavelength light source 202.

Figure 4:
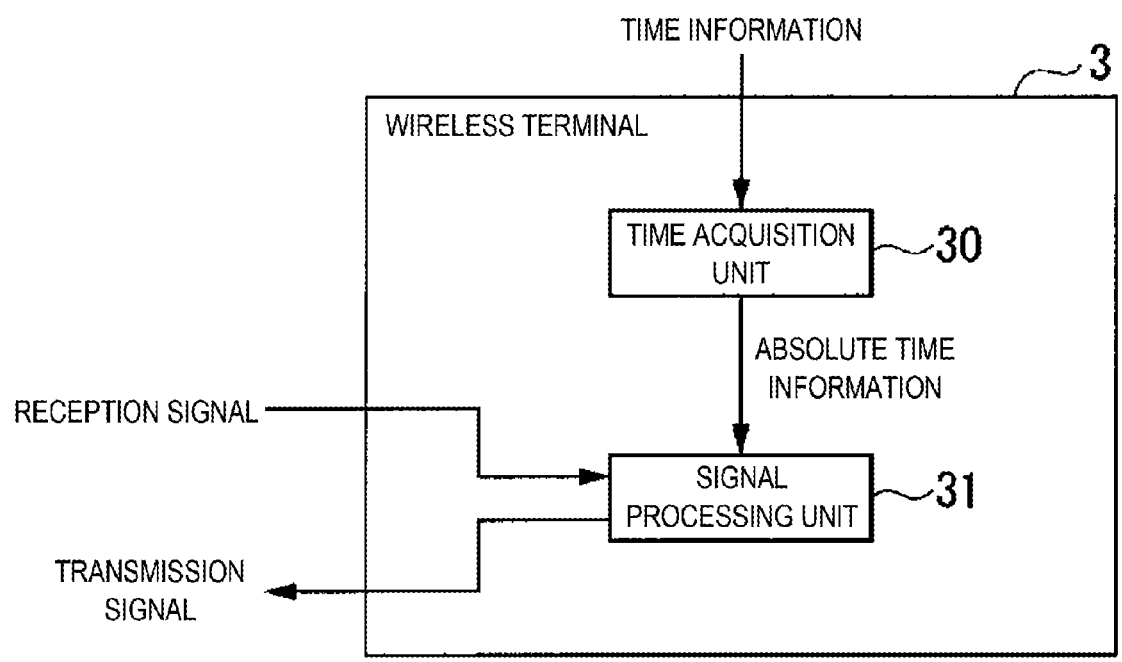
FIG. 4 shows an example of a configuration of a wireless terminal in the first embodiment.

FIG. 4 shows an example of a configuration of the wireless terminal 3 in the case where the accommodation station device 20a derives the transmission time periods. The wireless terminal 3 includes a time acquisition unit 30 and a signal processing unit 31. The time acquisition unit 30 acquires time information from a radio-controlled clock or the like. The time acquisition unit 30 outputs absolute time information indicated by the acquired time information to the signal processing unit 31. When a radio-wave signal (reception signal) based on a downlink optical signal is received, the signal processing unit 31 acquires absolute time information as information on a reception time. The signal processing unit 31 feeds back a radio-wave signal including the information on the reception time, as an uplink transmission signal, to the accommodation station device 20a.

(Where the Wireless Terminal 3 Derives the Transmission Time Periods)

The extension station device 23a-m transmits a radio-wave signal including information on the communication start time "$t_{1\_tx}$" and a radio-wave signal including information on the communication start time "$t_{2\_tx}$" to the wireless terminal 3-n. The wireless terminal 3-n derives the transmission time period "$\Delta t_1$", based on the communication start time "$t_{1\_tx}$" notified by using the radio-wave signal transmitted from the accommodation station device 20a, and on the reception time "$t_{1\_rx}$". The wireless terminal 3-n derives the transmission time period "$\Delta t_2$", based on the communication start time "$t_{2\_tx}$" notified by using the radio-wave signal transmitted from the accommodation station device 20a, and on the reception time "$t_{2\_rx}$". The wireless terminal 3-n feeds back information on the transmission time period "$\Delta t_1$" to the extension station device 23a-m. The wireless terminal 3-n feeds back information on the transmission time period "$\Delta t_2$" to the extension station device 23a-m. When sending the feedback, the wireless terminal 3-n uses a predetermined antenna of the wireless terminal 3-n. When the wireless terminal 3-n includes an array antenna, the wireless terminal 3-n may perform beamforming.

Next, examples of operation in the communication system 1a will be described.

Figure 5:
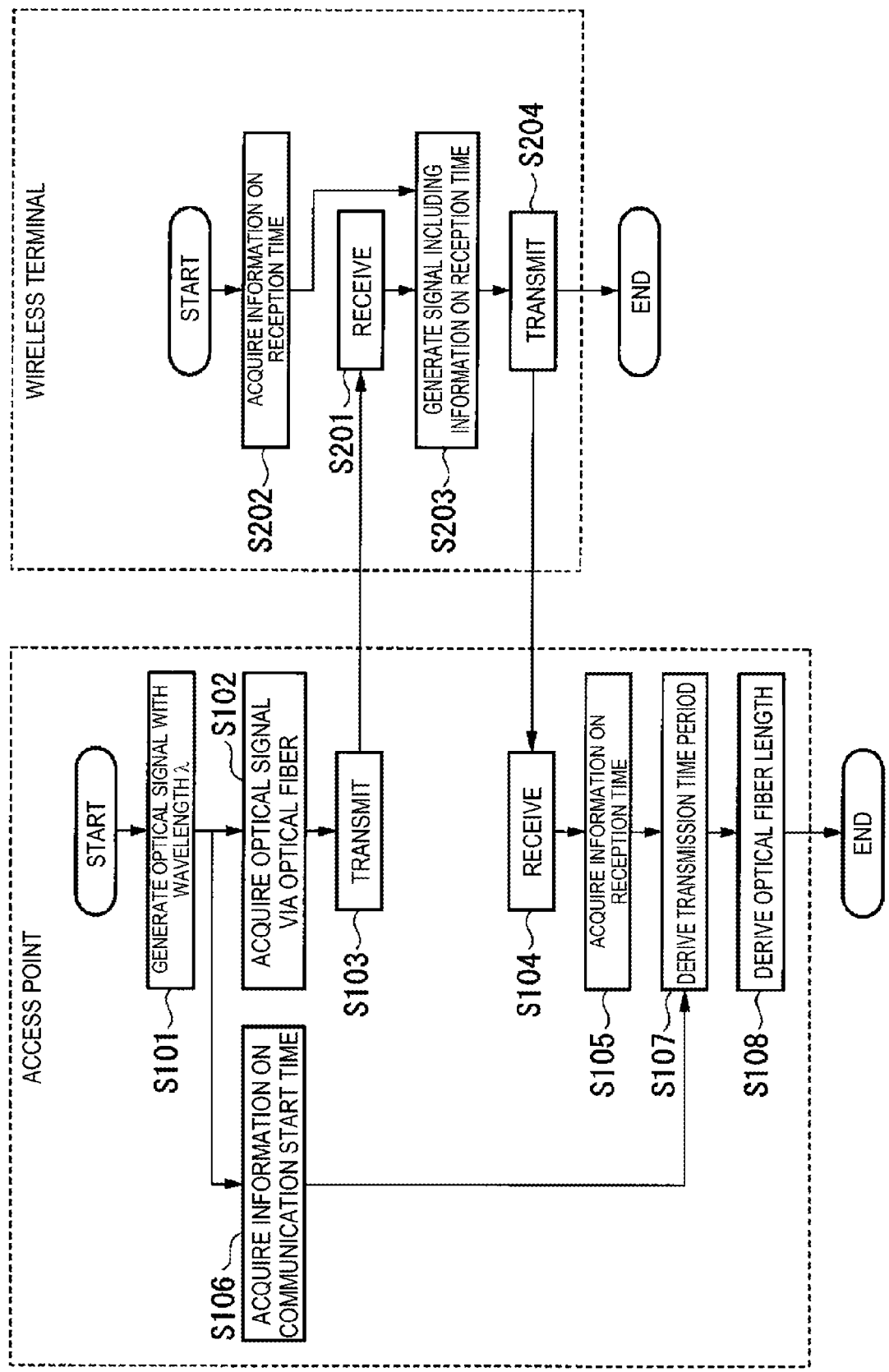
FIG. 5 is a sequence chart showing a first example of operation in the communication system in the first embodiment.

FIG. 5 is a sequence chart showing a first example of the operation in the communication system 1a (an example in which the access point 2a derives transmission time periods). The optical modulator 203 generates optical signals with wavelengths "λ" (step S101). The optical demultiplexer 230a acquires the optical signals via the optical fiber 21 (step S102). Respective ones of the optical detectors 231 transmit downlink radio-wave signals by using the respective antennas (step S103).

The optical detectors 231 receives uplink radio-wave signals by using the antennas that have transmitted the downlink radio-wave signals (step S104). When the signal processing unit 201 acquires uplink RF signals, the transmission time period derivation unit 206 acquires information on reception times (step S105). The transmission time period derivation unit 206 acquires information on communication start times (step S106). The transmission time period derivation unit 206 derives transmission time periods "Δt", based on the communication start times and the reception times (step S107). The optical fiber length derivation unit 207 derives an optical fiber length between an extension station device 23a including the antennas that have transmitted the downlink radio-wave signals and the accommodation station device 20a, based on the respective transmission time periods "Δt" with respect to the optical signals (step S108).

The signal processing unit 31 receives the downlink radio-wave signals (step S201). The signal processing unit 31 acquires absolute time information, as the information on the reception times, from the time acquisition unit 30 (step S202). The signal processing unit 31 generates radio-wave signals including the information on the reception times, respectively (step S203). The signal processing unit 31 transmits the uplink radio-wave signals (step S204).

Figure 6:
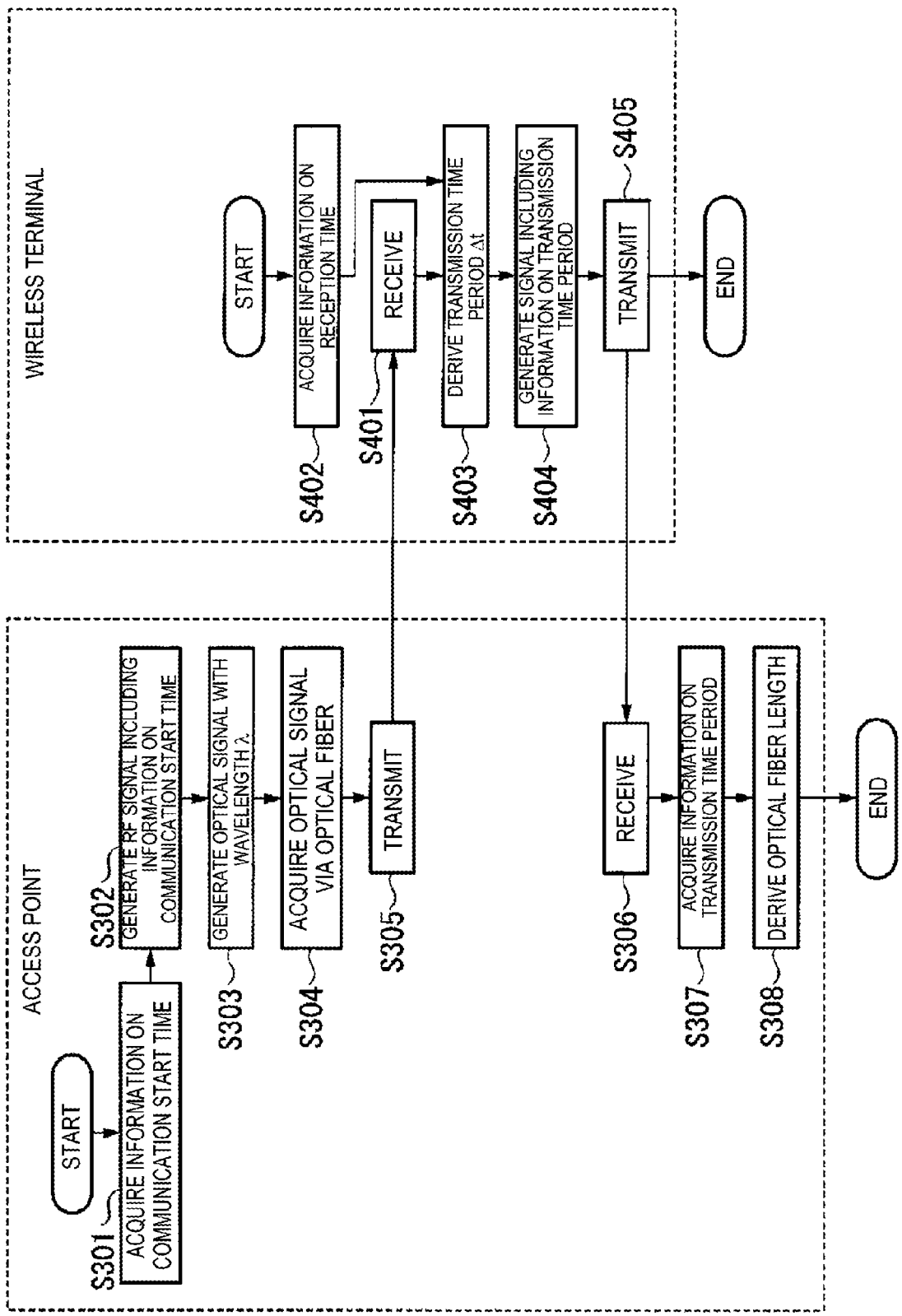
FIG. 6 is a sequence chart showing a second example of operation in the communication system in the first embodiment.

FIG. 6 is a sequence chart showing a second example of the operation in the communication system 1a (an example in which the wireless terminal 3 derives transmission time periods). When the wireless terminal 3 derives transmission time periods, the accommodation station device 20a does not need to include the transmission time period derivation unit 206. The signal processing unit 201 acquires information on communication start times (step S301). The signal processing unit 201 generates RF signals including the information on the communication start times, respectively (step S302). The optical modulator 203 generates optical signals with wavelengths "λ" (step S303). The optical demultiplexer 230a acquires the optical signals via the optical fiber 21 (step S304). Respective ones of the optical detectors 231 transmit downlink radio-wave signals by using the respective antennas (step S305).

The optical detectors 231 receive uplink radio-wave signals by using the antennas that have transmitted the downlink radio-wave signals (step S306). The optical fiber length derivation unit 207 acquires information on transmission time periods "Δt" from the signal processing unit 201 (step S307). The optical fiber length derivation unit 207 derives an optical fiber length between an extension station device 23a including the antennas that have transmitted the downlink radio-wave signals and the accommodation station device 20a, based on the transmission time periods of the optical signals (step S308).

The signal processing unit 31 receives the downlink radio-wave signals (step S401). The signal processing unit 31 acquires absolute time information, as information on respective reception times, from the time acquisition unit 30 (step S402). The signal processing unit 31 derives the transmission time periods "Δt", based on the communication start times and the reception times (step S403). The signal processing unit 31 generates the radio-wave signals including the information on the transmission time periods "Δt", respectively (step S404). The signal processing unit 31 transmits the uplink radio-wave signals (step S405).

As described above, the communication system 1a in the first embodiment includes the access point 2a and the one or more wireless terminals 3. The access point 2a includes the accommodation station device 20a and the extension station devices 23a. The accommodation station device 20a and each extension station device 23a are connected to each other through the optical fiber 21. The wireless terminal 3 communicates with the extension station devices 23a by using a radio-wave signal. The accommodation station device 20a includes the antennas (transmission unit, or transmitter) of the optical detectors 231, the signal processing unit 201 (communication start time information acquisition unit, communication start time information acquisitor, reception time information acquisition unit, or reception time information acquisitor), and the optical fiber length derivation unit (optical fiber length derivator) 207. When a time in the accommodation station device 20a and a time in the wireless terminal 3 are synchronized with each other, the antennas of corresponding ones of the optical detectors 231 transmit a first radio-wave signal according to an optical signal with a first wavelength "$\lambda_1$" and a second radio-wave signal according to an optical signal with a second wavelength "$\lambda_2$". The signal processing unit 201 acquires information on a first communication start time that is a time at which communication using the optical signal with the first wavelength is started, and information on a second communication start time that is a time at which communication using the optical signal with the second wavelength is started. The signal processing unit 201 acquires information on a first reception time that is a time at which the wireless terminal receives the first radio-wave signal, and information on a second reception time that is a time at which the wireless terminal receives the second radio-wave signal. The optical fiber length derivation unit 207 derives the optical fiber length "l", based on the first communication start time "$t_{1\_tx}$", the first reception time "$t_{1\_rx}$", the second communication start time "$t_{2\_tx}$", the second reception time "$t_{2\_rx}$", the group velocity "$v_1$" of the optical signal with the first wavelength, and the group velocity "$v_2$" of the optical signal with the second wavelength.

Thus, it is possible to estimate the optical fiber length "l" between the accommodation station device 20a and any extension station device 23a, without the extension station device 23a including the signal processing unit 201.

The transmission time period derivation unit 206 or the signal processing unit 31 derives a first transmission time period "$\Delta t_1$" that is a time period from the first communication start time "$t_{1\_tx}$" until the first reception time "$t_{1\_rx}$". The transmission time period derivation unit 206 or the signal processing unit 31 derives a second transmission time period "$\Delta t_2$" that is a time period from the second communication start time "$t_{2\_tx}$" until the second reception time "$t_{2\_rx}$". The optical fiber length derivation unit 207 derives the optical fiber length "l" as in Expression (5), based on a difference between the first transmission time period "$\Delta t_1$" and the second transmission time period "$\Delta t_2$", and on the group velocity "$v_1$" of the optical signal with the first wavelength and the group velocity "$v_2$" of the optical signal with the second wavelength.

Information on the first transmission time period "$\Delta t_1$" and information on the second transmission time period "$\Delta t_2$" may be acquired from electrical signals (RF signals) associated with received radio-wave signals, respectively. The information on the first reception time and the information on the second reception time may be acquired from electrical signals (RF signals) associated with received radio-wave signals, respectively.

Second Embodiment

A second embodiment is different from the first embodiment in a point that a group delay time is used instead of a group velocity, in estimation of an optical fiber length. In the second embodiment, the point different from the first embodiment will be described.

In estimation of the optical fiber length "l", a group delay time may be used instead of a group velocity. A group delay time is a transmission time period per unit length, and is represented by a reciprocal of a group velocity. A group delay time of an optical signal in the optical fiber segment is determined depending on a type of the optical fiber 21 and a wavelength of the optical signal. Expression (4) is expressed as in Expression (6).

$$\Delta t_1 - \Delta t_2 = l \times \tau_1 - l \times \tau_2 \tag{6}$$

Here, "$\tau_1$" represents a group delay time of the optical signal with the wavelength "$\lambda_1$" in the optical fiber segment. "$\tau_2$" represents a group delay time of the optical signal with the wavelength "$\lambda_2$" in the optical fiber segment. The optical fiber length "l" is expressed as in Expression (7).

$$l = \frac{\Delta t_1 - \Delta t_2}{\tau_1 - \tau_2} \tag{7}$$

The fiber information storage unit 209 stores information on the group delay times. The accommodation station device 20a derives the optical fiber length "l" as in Expression (7), based on the group delay time "$\tau_1$" and the group delay time "$\tau_2$" that are already known, and on a transmission time period "$\Delta t_1$" and a transmission time period "$\Delta t_2$" that are based on acquired absolute time information. The transmission time period derivation unit 206 derives the transmission time periods of the optical signals as in Expressions (1) and (2), based on respective communication start times and reception times.

The optical fiber length derivation unit 207 acquires the information on the group delay times from the fiber information storage unit 209. The optical fiber length derivation unit 207 derives the optical fiber length as in Expressions (3), (6), and (7), based on the derived transmission time periods and the group delay times.

As described above, the optical fiber length derivation unit 207 in the second embodiment derives the optical fiber length "l", based on the first communication start time "$t_{1\_tx}$", the first reception time "$t_{1\_rx}$", the second communication start time "$t_{2\_tx}$", the second reception time "$t_{2\_rx}$", the group delay time "$\tau_1$" of the optical signal with the first wavelength, and the group delay time "$\tau_2$" of the optical signal with the second wavelength.

Thus, it is possible to estimate, based on group delay times, the optical fiber length "l" between the accommodation station device 20a and any extension station device 23a, without the extension station device 23a including the signal processing unit 201.

The transmission time period derivation unit 206 or the signal processing unit 31 derives the first transmission time period "$\Delta t_1$" that is a time period from the first communication start time "$t_{1\_tx}$" until the first reception time "$t_{1\_rx}$". The transmission time period derivation unit 206 or the signal processing unit 31 derives the second transmission time period "$\Delta t_2$" that is a time period from the second communication start time "$t_{2\_tx}$" until the second reception time "$t_{2\_rx}$". The optical fiber length derivation unit 207 derives the optical fiber length "l" as in Expression (7), based on a difference between the first transmission time period "$\Delta t_1$" and the second transmission time period "$\Delta t_2$", and on the delay time "$\tau_1$" of the optical signal with the first wavelength and the delay time "$\tau_2$" of the optical signal with the second wavelength.

Third Embodiment

A third embodiment is different from the first and second embodiments in a point that an optical fiber length is estimated based on uplink optical signals. In the third embodiment, the point different from the first and second embodiments will be described.

In the first and second embodiments, the accommodation station device 20a or the wireless terminal 3 derives transmission time periods of optical signals with mutually different wavelengths in a downlink between the accommodation station device 20a and the wireless terminal 3. In the third embodiment, the accommodation station device 20a or the wireless terminal 3 derives transmission time periods of optical signals with mutually different wavelengths in an uplink between the accommodation station device 20a and the wireless terminal 3.

When uplink communication using the optical signal with the wavelength "$\lambda_1$" is started, the wireless terminal 3-n acquires absolute time information as information on a communication start time "$t_{1\_tx}$". When a radio-wave signal based on the optical signal with the wavelength "$\lambda_1$" is received, the accommodation station device 20a acquires absolute time information as information on a reception time "$t_{1\_rx}$". Here, the reception time is not a time at which the radio-wave signal is received by an antenna of an extension station device 23a, but is a time at which an optical signal transmitted through the optical fiber 21 from the extension station device 23a is received by the accommodation station device 20a (reception time related to the radio-wave signal).

When uplink communication using the optical signal with the wavelength "$\lambda_2$" is started, the wireless terminal 3-n acquires absolute time information as information on a communication start time "$t_{2\_tx}$". When a radio-wave signal based on the optical signal with the wavelength "$\lambda_2$" is received, the accommodation station device 20a acquires absolute time information as information on a reception time "$t_{2\_rx}$". As in the first embodiment, the optical fiber length can be estimated based on the communication start times and the reception times.

In the third embodiment, in a case where the accommodation station device 20a derives a transmission time period "$\Delta t_1$" and a transmission time period "$\Delta t_2$", since feedback is not required, the optical fiber length "l" can be estimated efficiently, compared to the first embodiment.

In the case where the accommodation station device 20a derives the transmission time period "$\Delta t_1$" and the transmission time period "$\Delta t_2$", the wireless terminal 3-n transmits, to the extension station device 23a-m, the radio-wave signal including the information on the communication start time "$t_{1\_tx}$" and the radio-wave signal including the information on the communication start time "$t_{2\_tx}$". The accommodation station device 20a derives the transmission time period "$\Delta t_1$", based on the communication start time "$t_{1\_tx}$" notified by using the radio-wave signal transmitted from the wireless terminal 3-n, and on the reception time "$t_{1\_rx}$". The accommodation station device 20a derives the transmission time period "$\Delta t_2$", based on the communication start time "$t_{2\_tx}$" notified by using the radio-wave signal transmitted from the wireless terminal 3-$n$, and on the reception time "$t_{2\_rx}$".

As described above, the optical fiber length derivation unit 207 in the third embodiment derives the optical fiber length, based on the uplink optical signals. Thus, it is possible to estimate the optical fiber length "l" between the accommodation station device 20a and any extension station device 23a by using uplink optical signals, without the extension station device 23a including the signal processing unit 201. In the case where the accommodation station device 20a derives the transmission time period "$\Delta t_1$" and the transmission time period "$\Delta t_2$", since feedback is not required, the optical fiber length "l" can be estimated efficiently, compared to the first embodiment.

Fourth Embodiment

A fourth embodiment is different from the first and second embodiments in a point that an optical fiber length is estimated based on a downlink optical signal and an uplink optical signal. In the fourth embodiment, the point different from the first and second embodiment will be described.

In the first and second embodiments, the accommodation station device 20a or the wireless terminal 3 derives transmission time periods of optical signals with mutually different wavelengths in a downlink between the accommodation station device 20a and the wireless terminal 3. In the fourth embodiment, the accommodation station device 20a or the wireless terminal 3 derives a difference between a transmission time period of a downlink optical signal and a transmission time period of an uplink optical signal, by using the optical signals with mutually different wavelengths between the accommodation station device 20a and the wireless terminal 3. The accommodation station device 20a or the wireless terminal 3 estimates the optical fiber length, based on the derived difference between the transmission time periods.

The accommodation station device 20a acquires information on a communication start time with respect to a downlink optical signal. The accommodation station device 20a acquires a reception time with respect to the downlink optical signal from the wireless terminal 3-$n$. The accommodation station device 20a acquires information on a communication start time with respect to an uplink optical signal from the wireless terminal 3-$n$. The accommodation station device 20a acquires a reception time of the uplink optical signal.

Even when uplink and downlink radio-wave signals have different frequencies, transmission time periods "$t_r$" in the wireless segment are constant. Accordingly, as in the first and second embodiments, the optical fiber length can be estimated based on the communication start times and the reception times.

In the fourth embodiment, in a case where the accommodation station device 20a derives a transmission time period "$\Delta t_1$" and a transmission time period "$\Delta t_2$", since feedback is not required by communication being performed in a downlink and in an uplink in this order, the optical fiber length "l" can be estimated efficiently, compared to the first embodiment.

In the case where the accommodation station device 20a derives the transmission time period "$\Delta t_1$" and the transmission time period "$\Delta t_2$", the accommodation station device 20a starts downlink communication using the optical signal with the wavelength "$\lambda_1$". The accommodation station device 20a stores information on a communication start time "$t_{1\_tx}$". The wireless terminal 3-$n$ stores information on a reception time "$t_{1\_rx}$". The wireless terminal 3-$n$ starts uplink communication using a radio-wave signal. The wireless terminal 3-$n$ transmits the radio-wave signal including information on a communication start time "$t_{2\_tx}$" and the information on the reception time "$t_{1\_rx}$" to the extension station device 23a-$m$. The extension station device 23a-$m$ transmits the information on the reception time "$t_{1\_rx}$" to the accommodation station device 20a by using the optical signal with the wavelength "$\lambda_2$". When the optical signal with the wavelength "$\lambda_2$" is received, the accommodation station device 20a acquires absolute time information as information on a reception time "$t_{2\_rx}$".

The accommodation station device 20a derives the transmission time period "$\Delta t_1$", based on the communication start time "$t_{1\_tx}$", and on the reception time "$t_{1\_rx}$" notified by using the radio-wave signal transmitted from the wireless terminal 3-$n$. The accommodation station device 20a derives the transmission time period "$\Delta t_2$", based on the communication start time "$t_{2\_tx}$" notified by using the radio-wave signal transmitted from the wireless terminal 3-$n$, and on the reception time "$t_{2\_rx}$".

As described above, the optical fiber length derivation unit 207 in the fourth embodiment derives the optical fiber length, based on the downlink optical signal and the uplink optical signal. Thus, it is possible to estimate the optical fiber length "l" between the accommodation station device 20a and any extension station device 23a by using a downlink optical signal and an uplink optical signal, without the extension station device 23a including the signal processing unit 201. In the case where the accommodation station device 20a derives the transmission time period "$\Delta t_1$" and the transmission time period "$\Delta t_2$", feedback is not required by communication being performed in a downlink and in an uplink in this order, the optical fiber length "l" can be estimated efficiently, compared to the first embodiment.

Fifth Embodiment

A fifth embodiment is different from the first embodiment in a point that an accommodation station device includes a plurality of light sources with fixed wavelengths, instead of the multi-wavelength light source. In the fifth embodiment, the point different from the first embodiment will be described.

Figure 7:
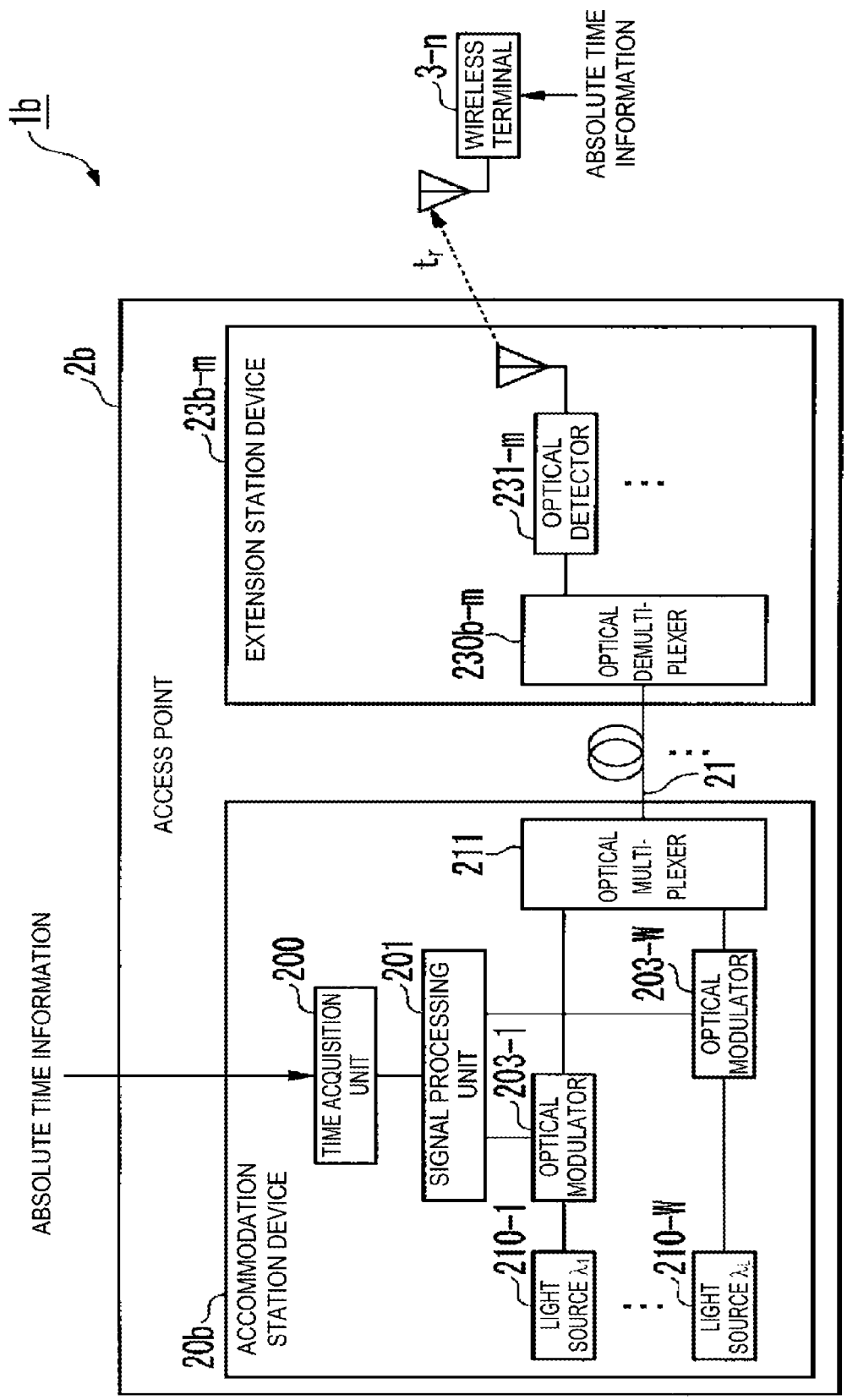
FIG. 7 shows an example of a configuration of part of a communication system in a fifth embodiment.

FIG. 7 shows an example of a configuration of part of a communication system 1b. The communication system 1b is a radio-over-fiber (ROF) system with a configuration of a passive optical network (PON). The communication system 1b includes an access point 2b and wireless terminals 3-1 to 3-N. The access point 2b is a communication device that connects one or more wireless terminals 3 to a predetermined network through wireless communication.

The access point 2b includes an accommodation station device 20b, an optical fiber 21, an optical splitter 22, and extension station devices 23b-1 to 23b-M. The accommodation station device 20b includes a time acquisition unit 200, a signal processing unit 201, optical modulators 203-1 to 203-W (W is an integer equal to or larger than two), light sources 210-1 to 210-W, and an optical multiplexer 211.

Each light source 210-$w$ (w is any one of integers from 2 to W) is a light source with a fixed wavelength. The light source 210-$w$ is connected to an optical modulator 203-$w$. The light source 210-$w$ generates an optical signal, according to a signal outputted from the signal processing unit 201.

The optical multiplexer 211 multiplexes respective optical signals generated by the light sources 210-1 to 210-W. The optical multiplexer 211 transmits the optical signal with the wavelength "λ1" to any extension station device 23a-m, according to a result of the multiplexing of the optical signals. The optical multiplexer 211 transmits the optical signal with the wavelength "λ₂" to the extension station device 23a-m, according to the result of the multiplexing.

As described above, the accommodation station device 20b in the fifth embodiment includes the light sources 210-1 to 210-W. The plurality of light sources 210 output streams of light with the fixed wavelengths ranging from the wavelength "λ₁" to a wavelength "λ_L" to the plurality of optical modulators 203 associated with the light sources 210, respectively. Thus, it is possible to estimate the optical fiber length "l" between the accommodation station device 20b and any extension station device 23b, without the extension station device 23a including the signal processing unit 201.

Sixth Embodiment

A sixth embodiment is different from the fifth embodiment in a point that each extension station device includes an optical demultiplexer for fixed wavelengths, instead of the variable optical demultiplexer. In the sixth embodiment, the point different from the fifth embodiment will be described.

Figure 8:
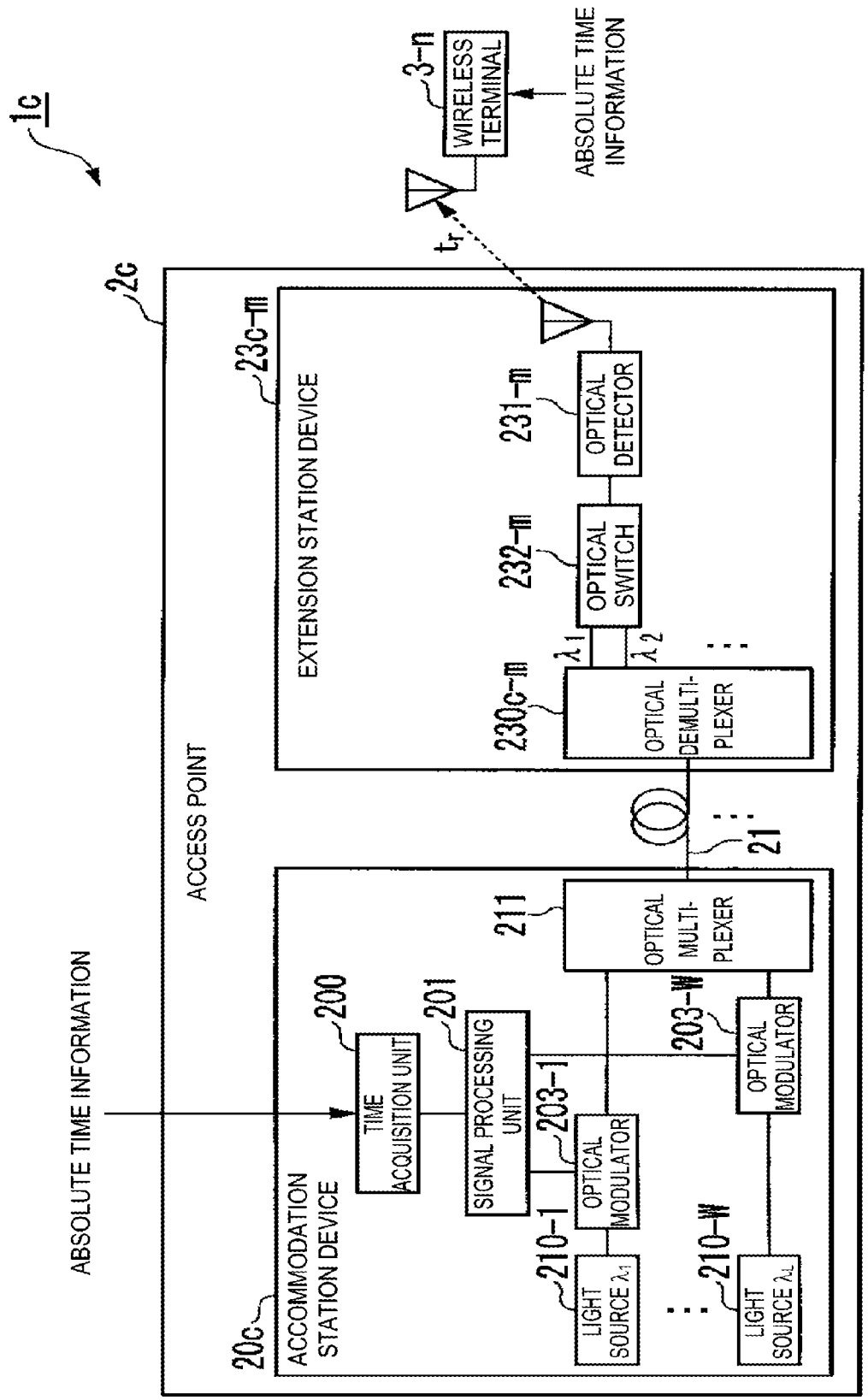
FIG. 8 shows an example of a configuration of part of a communication system in a sixth embodiment.

FIG. 8 shows an example of a configuration of part of a communication system 1c. The communication system 1c is a radio-over-fiber (ROF) system with a configuration of a passive optical network (PON). The communication system 1c includes an access point 2c and wireless terminals 3-1 to 3-N. The access point 2c is a communication device that connects one or more wireless terminals 3 to a predetermined network through wireless communication.

The access point 2c includes an accommodation station device 20c, an optical fiber 21, an optical splitter 22, and extension station devices 23c-1 to 23c-M. Each extension station device 23c includes an optical demultiplexer 230c, one or more optical switches 232, and one or more optical detectors 231.

The optical demultiplexer 230c is an optical demultiplexer for fixed wavelengths. The optical demultiplexer 230c outputs the optical signal with the wavelength "λ₁" and the optical signal with the wavelength "λ₂" to the optical switch 232. The optical switch 232 outputs, to the optical detector 231, the optical signal with the selected wavelength of the wavelength "λ₁" and the wavelength "λ₂". The optical detector 231 transmits a radio-wave signal according to the optical signal with the selected wavelength, at a predetermined frequency, from an antenna of the optical detector 231-m. Note that all optical fibers between the optical demultiplexer 230c and the optical switches 232 have the same length.

As described above, each extension station device 23c in the sixth embodiment includes the one or more optical switches 232 and the one or more optical detectors 231. The optical detector 231 transmits a radio-wave signal according to an optical signal of a selected wavelength, at a predetermined frequency, from an antenna of the optical detector 231-m. Thus, it is possible to estimate the optical fiber length "l" between the accommodation station device 20c and any extension station device 23c, without the extension station device 23c including the signal processing unit 201.

Seventh Embodiment

A seventh embodiment is different from the first embodiment in a point that transmission time periods "t_r" of radio-wave signals in a wireless segment are not constant. In the seventh embodiment, the point different from the first embodiment will be described.

When transmission time periods "t_r" of radio-wave signals in the wireless segment are not constant due to movement of the wireless terminal 3, an error in estimation of the optical fiber length "l" occurs according to a movement distance over which the wireless terminal 3 has moved. Accordingly, an allowance for the movement distance, or a movement speed, of the wireless terminal 3 is set, depending on an estimation error allowed in the communication system 1a. The wireless terminal 3 moves within a range of the allowance for the movement distance or the movement speed. The accommodation station device 20a estimates the optical fiber length "l", based on optical signals received from an extension station device 23a that is communicating with the wireless terminal 3 moving within the range of the allowance.

As described above, the optical fiber length derivation unit 207 in the seventh embodiment derives the optical fiber length "l", based on the optical signals received from the extension station device 23a that is communicating with the wireless terminal 3 moving within the range of the allowance. The optical fiber length derivation unit 207 determines whether or not the wireless terminal 3 moves within the range of the allowance, for example, based on a result of positioning by a positioning system that uses radio waves transmitted from artificial satellites. Thus, it is possible to estimate the optical fiber length "l" between the accommodation station device and any extension station device, without the extension station device 23a including the signal processing unit 201.

Eighth Embodiment

An eighth embodiment is different from the first embodiment in a point that radio waves from an artificial satellite or the like are used in time synchronization between an accommodation station device and a wireless terminal. In the eighth embodiment, the point different from the first embodiment will be described.

The accommodation station device 20a and the wireless terminal 3 acquire absolute time information from a clock of a positioning system, an atomic clock, a radio-controlled clock, or the like that use radio waves transmitted from an artificial satellite of the Global Positioning System (GPS) or the like. An error in estimation of the optical fiber length "l" occurs, according to an error in time synchronization between the accommodation station device 20a and the wireless terminal 3. Accordingly, a clock with a degree of accuracy that satisfies an estimation error allowed in the communication system 1a is selected.

As described above, the time acquisition unit 200 and the time acquisition unit 30 in the eighth embodiment acquires absolute time information from a radio-controlled clock or the like. Thus, it is possible to estimate the optical fiber length "l" between the accommodation station device and any extension station device, without the extension station device 23a including the signal processing unit 201. Note that each embodiment may be combined with one another.

Although the embodiments of the present invention have been described above with reference to the drawings, specific configurations are not limited to such embodiments, and include designs and the like within a scope that does not depart from the gist of the present invention.

INDUSTRIAL APPLICABILITY

The present invention is applicable to optical wireless communication systems.

REFERENCE SIGNS LIST 1a, 1b, 1c Communication system
2a, 2b Access point
3 Wireless terminal
20a, 20b, 20c Accommodation station device
21 Optical fiber
22 Optical splitter
23a, 23b, 23c Extension station device
30 Time acquisition unit
31 Signal processing unit
200 Time acquisition unit
201 Signal processing unit
202 Multi-wavelength light source
203 Optical modulator
204 Demultiplexer
205 Detector
206 Transmission time period derivation unit
207 Optical fiber length derivation unit
208 Control unit
209 Fiber information storage unit
210 Light source
211 Optical multiplexer
230a, 230b, 230c Optical demultiplexer
231 Optical detector
232 Optical switch

The invention claimed is:

1. A derivation method performed by a communication system including an access point and a wireless terminal, the access point including an accommodation station device and an extension station device connected to each other through an optical fiber transmitting an optical signal, and the wireless terminal communicating with the extension station device by using a radio-wave signal, the derivation method comprising:
when a time in the accommodation station device and a time in the wireless terminal are synchronized with each other, transmitting a first radio-wave signal according to an optical signal with a first wavelength, and a second radio-wave signal according to an optical signal with a second wavelength;
acquiring information on a first communication start time that is a time at which communication using the optical signal with the first wavelength is started, and information on a second communication start time that is a time at which communication using the optical signal with the second wavelength is started;
acquiring information on a first reception time that is a reception time related to the first radio-wave signal, and information on a second reception time that is a reception time related to the second radio-wave signal; and
deriving a length of the optical fiber, based on the first communication start time, the first reception time, the second communication start time, the second reception time, a group velocity or a group delay time of the optical signal with the first wavelength, and a group velocity or a group delay time of the optical signal with the second wavelength.

2. The derivation method according to claim 1, further comprising: deriving a first transmission time period that is a time period from the first communication start time until the first reception time, and deriving a second transmission time period that is a time period from the second communication start time until the second reception time, and
deriving the length of the optical fiber, based on a difference between the first transmission time period and the second transmission time period, the group velocity or the group delay time of the optical signal with the first wavelength, and the group velocity or the group delay time of the optical signal with the second wavelength.

3. The derivation method according to claim 2, further comprising: acquiring information on the first transmission time period from an electrical signal according to the received first radio-wave signal, and acquiring information on the second transmission time period from an electrical signal according to the received second radio-wave signal.

4. The derivation method according to claim 1, further comprising: acquiring the information on the first reception time from an electrical signal according to the received first radio-wave signal, and acquiring the information on the second reception time from an electrical signal according to the received second radio-wave signal.

5. A communication system, comprising:
an access point including an accommodation station device and an extension station device connected to each other through an optical fiber transmitting an optical signal; and
a wireless terminal that communicates with the extension station device by using a radio-wave signal,
wherein the accommodation station device includes
a transmitter that, when a time in the accommodation station device and a time in the wireless terminal are synchronized with each other, transmits a first radio-wave signal according to an optical signal with a first wavelength, and a second radio-wave signal according to an optical signal with a second wavelength,
a communication start time information acquisitor that acquires information on a first communication start time that is a time at which communication using the optical signal with the first wavelength is started, and information on a second communication start time that is a time at which communication using the optical signal with the second wavelength is started,
a reception time information acquisitor that acquires information on a first reception time that is a reception time related to the first radio-wave signal, and information on a second reception time that is a reception time related to the second radio-wave signal, and
an optical fiber length derivator that derives a length of the optical fiber, based on the first communication start time, the first reception time, the second communication start time, the second reception time, a group velocity or a group delay time of the optical signal with the first wavelength, and a group velocity or a group delay time of the optical signal with the second wavelength,
wherein each of the transmitter, the communication start time information acquisitor, the reception time information acquisitor, and the optical fiber length derivator is implemented by:
i) computer executable instructions executed by at least one processor,
ii) at least one circuitry or
iii) a combination of computer executable instructions executed by at least one processor and at least one circuitry.

6. An accommodation station device in a communication system including an access point and a wireless terminal, the access point including the accommodation station device and an extension station device connected to each other through an optical fiber transmitting an optical signal, and the wireless terminal communicating with the extension station device by using a radio-wave signal, the accommodation station device comprising:

- a transmitter that, when a time in the accommodation station device and a time in the wireless terminal are synchronized with each other, transmits a first radio-wave signal according to an optical signal with a first wavelength, and a second radio-wave signal according to an optical signal with a second wavelength;
- a communication start time information acquisitor that acquires information on a first communication start time that is a time at which communication using the optical signal with the first wavelength is started, and information on a second communication start time that is a time at which communication using the optical signal with the second wavelength is started;
- a reception time information acquisitor that acquires information on a first reception time that is a reception time related to the first radio-wave signal, and information on a second reception time that is a reception time related to the second radio-wave signal; and
- an optical fiber length derivator that derives a length of the optical fiber, based on the first communication start time, the first reception time, the second communication start time, the second reception time, a group velocity or a group delay time of the optical signal with the first wavelength, and a group velocity or a group delay time of the optical signal with the second wavelength, wherein each of the transmitter, the communication start time information acquisitor, the reception time information acquisitor, and the optical fiber length derivator is implemented by:
  i) computer executable instructions executed by at least one processor,
  ii) at least one circuitry or
  iii) a combination of computer executable instructions executed by at least one processor and at least one circuitry.

* * * * *